(12) United States Patent
Andrews et al.

(10) Patent No.: US 9,400,983 B1
(45) Date of Patent: Jul. 26, 2016

(54) METHOD AND SYSTEM FOR IMPLEMENTING BEHAVIOR ISOLATING PREDICTION MODEL

(75) Inventors: Burton Warren Andrews, Dublin, OH (US); Nader Michel Gemayel, Westerville, OH (US); Dee Pai, Dublin, OH (US); Rebecca Jeanette-Paul Sela, Powell, OH (US); Joshua D. Svenson, Columbus, OH (US); Arthur Eladio Weston, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 633 days.

(21) Appl. No.: 13/468,166

(22) Filed: May 10, 2012

(51) Int. Cl.
*G06F 7/60* (2006.01)
*G06F 17/10* (2006.01)
*G06Q 30/02* (2012.01)
*G06F 17/30* (2006.01)

(52) U.S. Cl.
CPC ...... *G06Q 30/0201* (2013.01); *G06F 17/30601* (2013.01)

(58) Field of Classification Search
CPC .............. G06Q 30/02; G06Q 30/0202; G06Q 30/0201; G06F 17/30539; G06F 17/30595; G06F 17/30598; G06F 17/30601
USPC ............ 703/2; 705/7.33, 14.4, 7.29; 707/603, 707/737, 803, 805
See application file for complete search history.

(56) References Cited

U.S. PATENT DOCUMENTS

| | | |
|---|---|---|
| 3,938,090 A | 2/1976 | Borison et al. |
| 4,558,318 A | 12/1985 | Katz et al. |
| 4,650,981 A | 3/1987 | Foletta |
| 4,651,150 A | 3/1987 | Katz et al. |
| 4,739,322 A | 4/1988 | Katz et al. |
| 4,750,036 A | 6/1988 | Martinez |
| 4,816,824 A | 3/1989 | Katz et al. |
| 4,948,174 A | 8/1990 | Thomson et al. |
| 5,121,945 A | 6/1992 | Thomson et al. |
| 5,432,326 A | 7/1995 | Noblett, Jr. et al. |
| 5,479,530 A | 12/1995 | Nair et al. |
| 5,495,284 A | 2/1996 | Katz |

(Continued)

FOREIGN PATENT DOCUMENTS

WO    WO 9743736    11/1997

OTHER PUBLICATIONS

Deng, Robert H. et al. A Probabilistic Approach to Fault Diagnosis in Linear Lightwave Networks, May 1992, pp. 1-22.

(Continued)

*Primary Examiner* — Eunhee Kim
(74) *Attorney, Agent, or Firm* — Hunton & Williams LLP

(57) ABSTRACT

According to an embodiment of the present invention, a computer implemented method and system for isolating variables in a behavior prediction model comprises: identifying a plurality of groups comprising a first group of variables and a second group of variables; building a model, using a computer processor, for capturing an effect of the first group of variables in predicting behavior for customers; building a subsequent stage of the model, using a computer processor, on a second group of variables to neutralize the effect of the first group of variables; displaying results of the model wherein the results minimize the effect of the first group of variables in predicting behavior at a user interface; and identifying a response based on the results for a segment of the customers.

22 Claims, 14 Drawing Sheets

(56) References Cited

U.S. PATENT DOCUMENTS

| | | | |
|---|---|---|---|
| 5,592,553 A | 1/1997 | Guski et al. |
| 5,615,277 A | 3/1997 | Hoffman |
| 5,661,807 A | 8/1997 | Guski et al. |
| 5,734,887 A | 3/1998 | Kingberg et al. |
| 5,764,789 A | 6/1998 | Pare, Jr. et al. |
| 5,794,178 A | 8/1998 | Caid et al. |
| 5,805,719 A | 9/1998 | Pare, Jr. et al. |
| 5,812,849 A | 9/1998 | Nykiel et al. |
| 5,819,226 A | 10/1998 | Gopinathan et al. |
| 5,838,812 A | 11/1998 | Pare, Jr. et al. |
| 5,870,723 A | 2/1999 | Pare, Jr. et al. |
| 5,892,900 A | 4/1999 | Ginter et al. |
| 5,960,200 A | 9/1999 | Eager et al. |
| 6,023,280 A | 2/2000 | Becker et al. |
| 6,029,002 A | 2/2000 | Afifi et al. |
| 6,081,808 A | 6/2000 | Blackman et al. |
| 6,101,489 A | 8/2000 | Lannert et al. |
| 6,154,879 A | 11/2000 | Pare, Jr. et al. |
| 6,292,933 B1 | 9/2001 | Bahrs et al. |
| 6,321,212 B1 | 11/2001 | Lange |
| 6,321,337 B1 | 11/2001 | Reshef et al. |
| 6,330,546 B1 | 12/2001 | Gopinathan et al. |
| 6,332,163 B1 | 12/2001 | Bowman-Amuah |
| 6,366,682 B1 | 4/2002 | Hoffman et al. |
| 6,405,364 B1 | 6/2002 | Bowman-Amuah |
| 6,438,594 B1 | 8/2002 | Bowman-Amuah |
| 6,438,666 B2 | 8/2002 | Cassagnol et al. |
| 6,442,748 B1 | 8/2002 | Bowman-Amuah |
| 6,467,052 B1 | 10/2002 | Kaler et al. |
| 6,477,580 B1 | 11/2002 | Bowman-Amuah |
| 6,539,337 B1 | 3/2003 | Provan et al. |
| 6,571,282 B1 | 5/2003 | Bowman-Amuah |
| 6,578,068 B1 | 6/2003 | Bowman-Amuah |
| 6,601,233 B1 | 7/2003 | Underwood |
| 6,606,744 B1 | 8/2003 | Mikurak |
| 6,629,081 B1 | 9/2003 | Cornelius et al. |
| 6,640,238 B1 | 10/2003 | Bowman-Amuah |
| 6,640,249 B1 | 10/2003 | Bowman-Amuah |
| 6,671,818 B1 | 12/2003 | Mikurak |
| 6,675,228 B1 | 1/2004 | Bahrs et al. |
| 6,701,514 B1 | 3/2004 | Haswell et al. |
| 6,718,535 B1 | 4/2004 | Underwood |
| 6,738,933 B2 | 5/2004 | Fraenkel et al. |
| 6,901,406 B2 | 5/2005 | Nabe et al. |
| 6,970,830 B1 | 11/2005 | Samra et al. |
| 7,003,476 B1 * | 2/2006 | Samra et al. ............... 705/7.28 |
| 7,006,979 B1 | 2/2006 | Samra et al. |
| 7,010,495 B1 | 3/2006 | Samra et al. |
| 7,047,251 B2 * | 5/2006 | Reed et al. |
| 7,124,101 B1 | 10/2006 | Mikurak |
| 7,167,844 B1 | 1/2007 | Leong et al. |
| 7,206,997 B2 | 4/2007 | Alden et al. |
| 7,315,826 B1 | 1/2008 | Guheen et al. |
| 7,698,398 B1 | 4/2010 | Lai |
| 2001/0037289 A1 | 11/2001 | Mayr et al. |
| 2002/0048369 A1 | 4/2002 | Ginter et al. |
| 2002/0062475 A1 | 5/2002 | Iborra et al. |
| 2002/0064149 A1 | 5/2002 | Elliott et al. |
| 2002/0099640 A1 | 7/2002 | Lange |
| 2003/0051026 A1 | 3/2003 | Carter et al. |
| 2003/0149653 A1 | 8/2003 | Penney et al. |
| 2003/0163431 A1 | 8/2003 | Ginter et al. |
| 2003/0191719 A1 | 10/2003 | Ginter et al. |
| 2003/0195830 A1 | 10/2003 | Merkoulovitch et al. |
| 2004/0030667 A1 * | 2/2004 | Xu et al. ............... 707/1 |
| 2004/0107125 A1 | 6/2004 | Guheen et al. |
| 2004/0117202 A1 | 6/2004 | Winklevoss et al. |
| 2005/0021363 A1 | 1/2005 | Stimson et al. |
| 2005/0096950 A1 | 5/2005 | Caplan et al. |
| 2006/0029261 A1 | 2/2006 | Hoffman et al. |
| 2006/0085334 A1 | 4/2006 | Murphy |

OTHER PUBLICATIONS

Taylor, Lester D., Telecommunications Deman Analysis in Transition, Proc. 31$^{st}$ Annual Hawaii International Conference on Systems Science, pp. 409-415 (1998).

Global Corruption Report 2004, Transparency International, Pluto Press, www.globalcorrupt, ISBN 07453 2231, Jun. 26, 2005, 415 pages.

* cited by examiner

METHOD AND SYSTEM FOR IMPLEMENTING BEHAVIOR ISOLATING PREDICTION MODEL

FIELD OF THE INVENTION

The present invention relates generally to predicting behavior and more specifically to implementing a behavior isolating prediction model that isolates a set of variables that typically heavily dominate the behavior and thereby base the prediction on another set of variables.

BACKGROUND OF THE INVENTION

In general attrition models that are applied to the financial industry, demographics are known to dominate the effect of the prediction. For example, for programs that require a minimum balance, most standard models tend to trend toward more affluent households who have the capability to participate. As a result, this general demographic dominates the models. Thus, more affluent households, regardless of their actual behavior and other important considerations, are generally flagged as being very unlikely to attrite.

Moreover, traditional models that control for affluence requires pre-segmentation in terms of determining cutoffs. However, the cutoffs are sometimes arbitrary. For most segmentations, there is a good amount of variability even within each segment. For example, a high affluence segment may range from total deposits of $500,000 to $5 million. Within segments, valuable information is lost between the bottom of one segment to the top of that segment.

Other drawbacks may also be present.

SUMMARY OF THE INVENTION

Accordingly, one aspect of an embodiment of the present invention is to address one or more of the drawbacks set forth above. According to an exemplary embodiment, a method and system neutralizes the effect of particular attributes of interest that may otherwise dominate a model, allowing the model to predict behavior for a given individual relative to other individuals that are similar in terms of these attributes. A method and system of an embodiment of the present invention seek to remove the effect of a set of variables that strongly affects a behavior so as to measure the effect of another set of variables. The technique is broad enough to apply in a wide variety of forums. An exemplary application of an embodiment of the present invention focuses on attrition behavior in a retail banking environment.

According to an exemplary embodiment of the present invention, a computer implemented method and system for isolating variables in a behavior prediction model, the method and system comprises: identifying a plurality of groups comprising a first group of variables and a second group of variables; building a model, using a computer processor, for capturing an effect of the first group of variables in predicting behavior for customers; building a subsequent stage of the model, using a computer processor, on a second group of variables to neutralize the effect of the first group of variables; displaying results of the model wherein the results minimize the effect of the first group of variables in predicting behavior at a user interface; and identifying a response based on the results for a segment of the customers.

In accordance with other aspects of this exemplary embodiment of the present invention, the method and system may further include the model predicts likelihood of attrition in a banking application; the first group of variables comprises demographic variables; the second group of variables comprises network strength variables or product relationship variables; the second group of variables comprises network strength variables and the plurality of groups comprises a third group of variables comprising product relationship variables; further comprises combining the results with one or more results of one or more additional iterations of applying the model and viewing the combined results in a matrix format; the variables for one or more of the first group and the second group are defined by the user; further comprises defining an order sequence for applying each group of the plurality of groups to the model; the response comprises a tailored marketing offer based on the results; a user selects an algorithm for building the model; and a user interacts with the results of the model by making changes to the model.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

Figure 1:
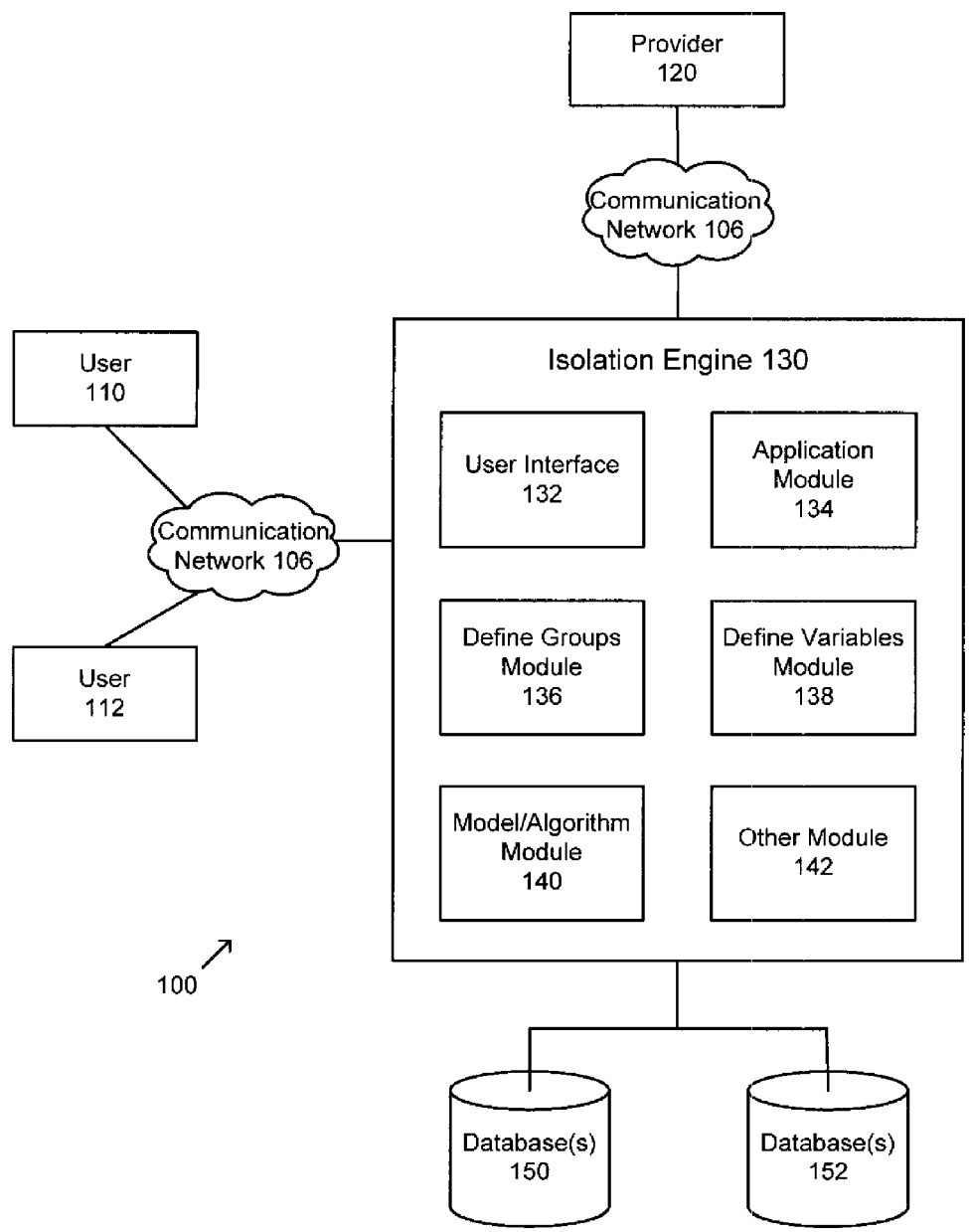
FIG. 1 is an exemplary diagram of a system for behavior isolation modeling, according to an embodiment of the present invention.

Demographic variables (e.g., age, income, wallet) strongly influence attrition to the extent that they typically block any easily observed effect of other factors. Attrition as it relates to a financial institution, for example, may represent whether a customer will close their account and move their business elsewhere. While the financial institution cannot control demographic variables, it can control other parameters, such as product offerings, how they communicate the offers, how to market products, etc. An embodiment of the present invention may be directed to measuring the effect of variables, such as network strength and product relationship, while removing the effects of other variables, such as demographics and other uncontrollable variables. By predicting behavior for an individual based on factors other than demographics but in such a way that the prediction is relative to other individuals with similar demographics, a financial institution is better positioned to address issues relating to product offers and relationships that are within their control. Moreover, this tool provides valuable information useful to better target and tailor marketing efforts.

According to an embodiment of the present invention, isolation modeling may involve a technique for predicting behavior based on a group of variables. The variables may be defined and customized depending on the application and other considerations. An embodiment of the present invention may predict behavior based on one group of variables while having neutralized the effect of other groups of variables in prior stages of the modeling process. Isolation modeling according to an embodiment of the present invention may be a multi-stage approach that provides the ability to predict, for example, behavior due only to product relationship variables assuming other demographic and network effects are neutralized. The use of multiple isolation models may provide clarity as to why a household is expected to behave as predicted. Using household checking retention as an example, isolation modeling provides more accurate predictions where demographics (or another primary factor) heavily dominate. As a result, the ability to target households based on whether they are likely to attrite due to demographics, network or product relationship factors enables relevant use of creatives, offers, servicing, etc.

A benefit of isolation modeling over more traditional approaches, e.g., a pre-segmentation approach, is the ability to maintain full sample as well as avoid a priori decisions on segmentation cutoffs that would otherwise be necessary.

Checking attrition is generally correlated with younger, lower balance households that live further away from branch locations. Standard models for predicting attrition place a heavy emphasis on variables such as wallet, income and age, which are highly correlated with lower balance. Thus, an embodiment of the present invention may predict a household's likelihood to attrite based on their relationship with the bank while having neutralized the effect of demographics. The likelihood to attrite would be relative to other households that look similar in terms of demographics. For instance, a more affluent household may be predicted to attrite based on their product relationship relative to other more affluent households as opposed to purely demographic factors. As a result, misclassifications may be effectively reduced by neutralizing the effect of demographic/network strength and isolating product behavior indicative of attrition.

FIG. 1 is an exemplary diagram of a system for behavior isolation modeling, according to an embodiment of the present invention. A system 100 of an embodiment of the present invention may include an Isolation Engine 130. The Isolation Engine 130 may be available via a web interface or other user interface. As illustrated in FIG. 1, system 100 may include a user communication device 110 associated with a user accessing a centralized system of an embodiment of the present invention. The user may establish a communication session with a communication device via a communication network 106.

User communication device 110 may be a computer, a personal computer, a laptop, a cellular communication device, a workstation, a mobile device, a phone, a handheld PC, a personal digital assistant ("PDA"), a thin system, a fat system, a network appliance, an Internet browser, or other any other device that may allow a user to communicate with an application system and the plurality of communication devices (e.g., computer, wireless mobile communication device, etc.) associated with other users via the communication network 106.

The communication network 106 may be coupled to Isolation Engine 130 and one or more communication devices (e.g., user communication device 110, 112, etc.). The communication network 106 may be a wireless network, a wired network or any combination of wireless network and wired network. For example, the communication network 106 may include one or more of a public switched telephone network (PTSN), a signaling system #7 (SS7) network, a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 106 may include, without limitation, telephone line, fiber optics, IEEE Ethernet 802.3, wide area network ("WAN"), local area network ("LAN"), or global network such as the Internet. The communication network 106 may support an Internet network, a wireless communication network, a cellular network, or the like, or any combination thereof. The communication network 106 may further include one, or any number of the exemplary types of networks mentioned above operating as a stand-alone network or in cooperation with each other. The communication network 106 may include a plurality of mobile switching centers (MSCs) and a plurality of signaling control points (SCPs).

The communication network 106 may utilize one or more protocols of one or more network elements to which it is communicatively coupled. The communication network 106 may translate to or from other protocols to one or more protocols of network devices. Although the communication network 106 is depicted as one network, it should be appreciated that according to one or more embodiments, the communication network 106 may comprise a plurality of interconnected networks, such as, for example, a service provider network, the Internet, a broadcaster's network, a cable television network, corporate networks, and home networks.

Isolation Engine 130 may be affiliated or associated with a Provider 120, such as a financial institution, marketing company and/or other entity interested in behavior isolation. Provider 120 may host or support Isolation Engine 130. In this example, the behavior modeling may appear to be performed by Provider 120, as a single consolidated unit. According to another example, Isolation Engine 130 may be separate and distinct from Provider 120. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

Upon receiving a request from user 110, 112, Isolation Engine 130 may access databases and/or other sources of information to perform behavior isolation prediction in accordance with an embodiment of the present invention. For example, Isolation Engine 130 may access and/or maintain Database 150, and/or other database 152. The databases may be further combined and/or separated. The databases may reside at a single location or separated through multiple locations. In addition, the databases may be supported by Provider 120 or an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different payment environments and platforms.

Database 152 may represent a profile database for storing and maintaining profile information for each customer or household. Each profile may include demographic information, product information network information, historical data, preferences including a method of payment, frequency of payment, preferred notification method and other relevant information.

In addition, Isolation Engine 130 may have access to other sources of data and/or data feeds that identify other metrics and/or information that may be relevant for processing payments. For example, Isolation Engine 130 may receive financial metrics. Financial metrics may be useful in accurately predicting how much a household is expected to maintain based on historical information. Financial metrics may be helpful in further refining behavior prediction. For example, an embodiment of the present invention may predict certain attrition behavior for a household. However, if their financial impact to the bank is minimal, this information may be considered in how they are strategically marketed. In other words, it may not be financially worthwhile the additional marketing efforts and costs in trying to keep this customer from leaving.

Isolation Engine 130 may include various modules and interfaces for performing isolation behavior prediction, according to an embodiment of the present invention. Isolation Engine 130 may include User Interface 132, Application Module 134, Define Group Module 136, Define Variable Module 138, Models/Algorithms Module 140 and and/or other modules, interfaces and/or processors, as represented by Other Module 224. While a single illustrative block, module or component is shown, these illustrative blocks, modules or components may be multiplied for various applications or different application environments. In addition, the modules or components may be further combined into a consolidated unit. Other architectures may be realized. The modules and/or components may be further duplicated, combined and/or separated across multiple systems at local and/or remote locations.

An embodiment of the present invention may be particularly useful for situations where a group of variables can have a significant effect on the model output, lessening the influence from other variables that are of interest as predictors. Isolation Engine 130 may provide the ability to isolate certain groups of variables in terms of predicting behavior while neutralizing the effect of others. An embodiment of the present invention may be directed to a software modeling algorithm that neutralizes the effect of a certain group of variables (Group 1) before predicting household behavior based on a different group of variables (Group 2). The resulting behavioral prediction is the likelihood for a household to behave based on Group 2 variables relative to households that look "similar" to the household in question according to the Group 1 variables.

For example, the likelihood for a household to attrite based on their product behavior may be predicted. After neutralizing the effects or removing any effect of demographics, an embodiment of the present invention may be able to identify a household's likelihood to attrite relative to its peers. Thus, the technique has the ability to hone in on specific behavior that is driving a potential risk for attrition. For example, a household may drop its direct deposit. A standard model may not necessarily identify this behavior and continue to score this affluent household as having a low likelihood to attrite based primarily on the household's affluence demographic. Missing from this analysis is any consideration of factors that indicate a likelihood to attrite. In this example, if a household drops direct deposit and ACH and makes several calls to the call center, an embodiment of the present invention may recognize these nuance behaviors, rather than rely primarily on the household's affluence metric. By removing the demographics first, an embodiment of the present invention may be able to consider and identify nuance behaviors that more accurately predict a likelihood to attrite.

Moreover, isolation modeling of an embodiment of the present invention provides an understanding of the reasons why a customer is likely to attrite. For example, an embodiment of the present invention may identify whether a customer is likely to attrite because of network strength alone and not product relationships or because of relationship alone and not demographic or network strength. As a result, providers are able to better tailor offers, such as services, cash offers, etc., and further provide the offers through an optimal channel. Thus, marketing campaigns may become more effective in targeting households based on their actual behavior rather than relying primarily on demographics.

An embodiment of the present invention may provide the ability to target and/or highlight certain services and products that are particularly useful and relevant to a certain customer. For example, a customer with good product relationships may live far away from a banking center. However, the customer may be considered to have a very high likelihood to attrite from an isolation technique because the network strength is poor (in other words, the customer lives far away from a banking center). Based on this information, a provider may target this customer with offers that highlight how many ATMs are available around the country, benefits of online services, mobile services and other services and products that do not rely on a strong banking presence. Thus, because a marketer has a better understanding of customers, the marketer may better target and tailor offers.

Users 110, 112 may access Isolation Engine 130 via a communication network 106. User Interface 132 may represent a graphical user interface accessible by users 110, 112. User interface 132 may receive one or more queries/requests from users via the communication devices. User Interface 132 may include an Application Programming Interface (API) to interact with users 110, 112 through communication devices. In an exemplary embodiment, User Interface 132 may present one or more graphical contents or displays to the users associated with the communication devices.

At Application Module 134, a user may identify an application for analysis. For example, an application may include attrition as applied to a banking institution. While the detailed description is directed to attrition modeling in a retail banking environment, the various embodiments of the present invention may be applied to other scenarios and applications involving behavior prediction based on multiple sets of variables where one set of variables is considered dominant. Thus, other applications may be identified and the appropriate data may be analyzed.

At Define Group Module 136, an embodiment of the present invention may allow the user to identify, define and/or select a variable group and further define which variables belong to those groups. For example, the user may start with three groups: (1) demographics, (2) network strength and (3) product relationships and further define additional groups. According to another embodiment, the groups may be predefined by the system.

At Define Variable Module 138, the user may define the variables that make up each identified group. For demographics, variables may include: age, income, revenue, home value, wealth, wallet, marital status, etc. For network strength, variables may include: whether a household lives in a neighborhood that has a strong banking presence, such as a lot of ATMs, work or live near a banking center, etc. For product relationships, variables may include: what are the balances; how many products, a checking account, a savings account, an investment, mortgage, etc.; how long have you owned those accounts; what are the balances; have the balances been changing; what type of services; do you use online services, such as online banking; do you use mobile banking and other mobile apps; do you visit branches; do you use a teller; do you make a lot of withdrawals, deposits and what are the amounts of those. According to another embodiment, the groups may be predefined by the system.

An embodiment of the present invention further allows the user to mix and match these groups. Typically, a user may isolate for one group of variables before isolating for another group of variables, before isolating for yet another group of variables. The order in which this occurs may be changed by the user. The order may be predetermined, selected by the user or performed on the fly.

At Models/Algorithms Module 140, the user may select or define which algorithm they want to use in building the model. Various model-building techniques may be employed. Some of the exemplary techniques may share three stages. A first stage may be directed to building a model to control a first (dominating) set of variables (e.g., demographics). A second stage may be directed to fixing the estimates for the first stage of variables, then estimating based on the next stage of variables (e.g., network strength). A third stage may be directed to repeating until additional variables are accounted for (e.g., relationship or behavior variables).

An exemplary model-building technique is referred to as "offset." For the second and third stages, the score from the previous stage is used as an offset in a logistic regression. For example, a neural network may be used in the first stage, but not in subsequent stages, given existing implementations of neural networks. The outputs may be "rolled up" to recover a complete attrition model.

In the offset approach, the first stage may build, for example, a model using logistic regression based off of the first group of variables. The second stage may then also use regression, built off of the second group of variables in addition to the first group of variables with the coefficients associated with the first group of variables being fixed at the values obtained from the model built in the first stage. In this way, the effect of the first stage variables in the second modeling stage is held constant.

In an exemplary application involving two input variables, the input $x_1$ is a first stage variable and $x_2$ is a second stage variable. Here, p is the estimated probability that the event of interest occurs (e.g., a household voluntarily ends its checking relationship).

A log odds ratio may be estimated as follows:

$$\log\left(\frac{p}{1-p}\right) = \hat{\beta}_0 + x_1\hat{\beta}_1 + x_2\hat{\beta}_2$$

The Offset approach may estimate each coefficient in stages. For example, a first stage may use only $x_1$:

$$\log\left(\frac{p}{1-p}\right) = \hat{\beta}_0^{(1)} + x_1\hat{\beta}_1^{(1)}$$

A second stage may estimate the coefficient for $x_2$ assuming the coefficient for $x_1$ is fixed at the value estimated in the first stage:

$$\log\left(\frac{p}{1-p}\right) = \hat{\beta}_0^{(2)} + x_1\hat{\beta}_1^{(1)} + x_1\hat{\beta}_2^{(2)}$$

Individuals may then be rank-ordered for targeting purposes using:

$$\hat{\beta}_0^{(2)} + x_1\hat{\beta}_2^{(2)}$$

An embodiment of the present invention allows a user to implement the offset method within a more general response modeling framework. For example, one could use the offset approach with an underlying neural network in the following manner:

The response model may be a neural network. Other models, such as smoothing spline, Gaussian process, etc., may be used.

Another exemplary model-building technique is referred to as "generalized additive modeling." There are three basic steps to this approach. The first step involves executing a logistic regression of attrition against demographic variables. In the second and third stages, estimate may be based on residuals that are weighted to reflect the estimated probability. The second step involves executing a weighted least squares regression of stage-one pseudo-responses on the network variables. The third stage is directed to executing a weighted least squares regression of stage-two pseudo-responses on the behavior variables. The outputs may be "rolled up" to recover a complete attrition model.

An exemplary approach may involving the following:

First, a standard neural network (or logistic regression) may be applied to the first stage variables. For example, the following may apply: Let $F(x)=0$.

Second, the residual from the first stage variables may be calculated as follows:

$$z = \frac{Y - \hat{p}(x_1)}{\hat{p}(x_1)(1 - \hat{p}(x_1))}$$

Third, a weighted least squares regression model $f_z(x_z)$ may be fit, using the stage 2 variables as inputs and the residuals above as outputs. The weights may be defined as follows:

$$w = \hat{p}(x_1)(1 - \hat{p}(x_1))$$

The predicted values in this second stage, based only on the second stage inputs, may be rank-ordered and used to prioritize households for targeting. Next, the following may be defined: $F(x) = F(x) + \frac{1}{2}f_2(x_2)$ and the estimated probability may be expressed as $$p(x) = \frac{e^{F(x)}}{e^{F(x)} + e^{-F(x)}}.$$

For stage 3 and beyond, the above first and second steps may be repeated with the next stage of input variables. If there are m total groups, the rank ordered $f_m(x_m)$ values may prioritize the observations in a manner that isolates the final group of variables after controlling for the previous m−1 sets of input variables.

Another method for performing isolation modeling may use a Pearson Residual Method. In the second and third stages, the Pearson residual (which takes on values on the whole real line) is modeled, rather than the original target. This technique may implement modeling of a continuous target variable. An alternative that may be used, due to preference or computational constraints, may be a discretized version. In the second and third stages, a target variable of 1 may be used for each record in which the target variable took on a value of 1 in the previous stage but also had a low score in the previous stage. In other words, this technique adds a binary variable that has value 1 when a household attrites, but had a low attrition predictor from the previous stage, and a value of 0 otherwise. The first stage simply fits the first set of variables. Estimation may be performed using neural nets in standard software.

Another approach for isolation modeling is to predict the probability of attrition due to the first group of variables (first stage). The error of this stage (e.g., the error of the attrition probability estimate relative to the actual attrition status of the households used to build the model) is then computed and used as an input into the second stage of the isolation sequence, which builds a model based on the second group of variables. One technique for computing error in this regard is to use a Pearson residual, which takes on values on the entire real line). A household that attrited but had a low attrition score (probability estimate) from the first stage has a high Pearson residual. With the residual being used as the target variable for the second stage, the model in the second stage is capable of identifying households that are Likely to attrite due to the variables used in the second stage but that were not likely to attrite due to the variables in the first stage.

An exemplary approach may involving the following:

First, a neural network (or logistic regression) of the target variable may be applied to the stage 1 variables. Second, a new target variable may be defined as being equal to the Pearson residual of the original target, e.g., if Y is equal to one if the customer attrited and 0 otherwise, and the estimated probability of attrition is, then the Pearson residual may be defined as follows:

$$\text{Residual} = \frac{Y - \hat{p}}{\sqrt{\hat{p}(1 - \hat{p})}}$$

In this example, $\hat{p}$ may represent the estimated probability that the target variable takes on a value of for a given observation (e.g., the household attrites their checking relationship). The residual may take on any value on the real line. The residual may be positive for all attriters, and negative for all non-attriters. For example, the residual may be greatest for attriters who had low estimated probabilities of attrition in the first stage. According to this approach, there is no or minimal loss of residual information. In this approach, a continuous response model (neural net, multiple regression, etc.) may be applied to the stage 2 variables. For stage 3 and beyond, another continuous response model may be applied to the usual residual encountered in a continuous response setting.

According to another application, the score of each stage of the isolation sequence may be used to determine an overall prediction of behavior as opposed to just using the score from the last stage. For example, an embodiment of the present invention may isolate for one group of variables and then predict the likelihood to behave relative to the second stage having that first stage neutralized. An overall prediction may include the result of the last stage. According to another example, scores from the other stages may be used in combination. This may involve grouping them together or combining them mathematically to come up with an overall prediction of behavior that takes into account each group of variables and their contribution to the behavior.

An exemplary usage of such models may involve identifying individuals with high relative probabilities using the final stage variables. Another exemplary usage of such models may include decomposing overall probabilities into the effects of the stages separately. The number of variable groups may be arbitrary and may be used in any order. According to an exemplary application, there may be four groups of variables with the effect of the first group removed in the first stage, the effect of the second group removed in the second stage, etc. The final prediction may be the likelihood to behave based on the fourth group of variables after neutralizing the effect of the first three groups.

Figure 2:
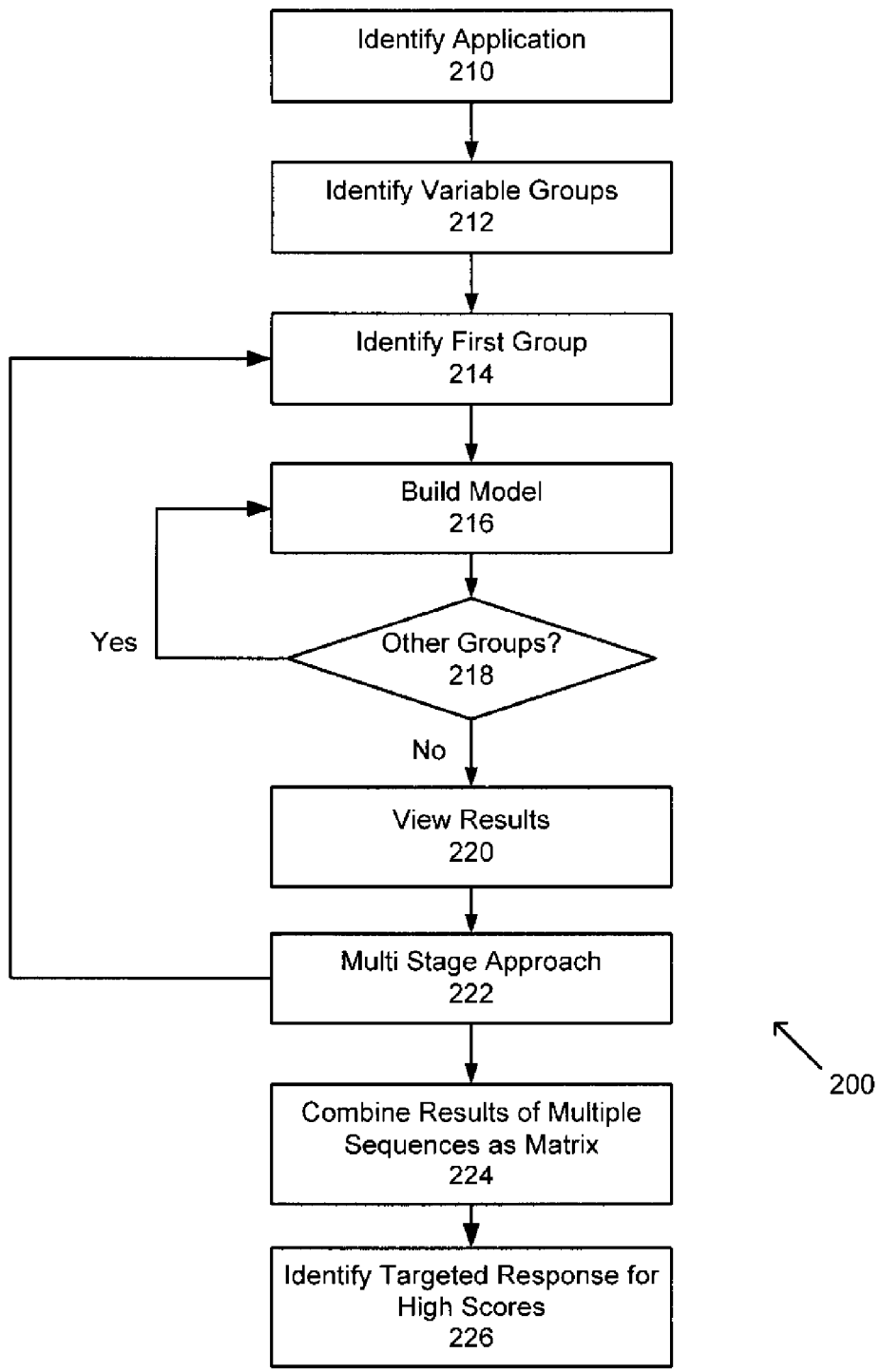
FIG. 2 is an exemplary flowchart illustrating a method for behavior isolation prediction, according to an embodiment of the present invention.

FIG. 2 is an exemplary flowchart illustrating a method for behavior isolation prediction, according to an embodiment of the present invention. This method is provided by way of example, as there are a variety of ways to carry out the methods described herein. Method 200 shown in FIG. 2 may be executed or otherwise performed by one or a combination of various systems. The method 200 may be carried out through system 100 of FIG. 1 by way of example. Each block shown in FIG. 2 represents one or more processes, methods, or subroutines carried out in method 200.

At step 210, an application may be identified. For example, a user may identify a checking attrition application in a banking environment. Other applications within the banking environment as well as other environments may be identified. At step 212, a plurality of variable groups as well as factors for each variable group may be identified. Further, an order sequence for isolation may be identified. At step 214, a first group for isolation may be identified. At step 216, a model may be built to remove the first group from the data. At step 218, modeling may be continued with a next group of variables. The modeling process may be repeated until all the variables are accounted for. At step 220, results of the modeling may be viewed. At step 222, a multi stage approach may be implemented where additional sequences and/or iterations may be performed. At step 224, the result of multiple sequences may be combined and viewed as a matrix. At step 226, further analysis may be performed which may involve identifying high scores based on the multiple variables. For example, one or more targeted offers may be identified for high scoring segments. While an exemplary sequence is illustrated in FIG. 2, the steps may be performed in a different order and combined. Also, additional steps may be added and/or steps may be removed.

Figure 3:
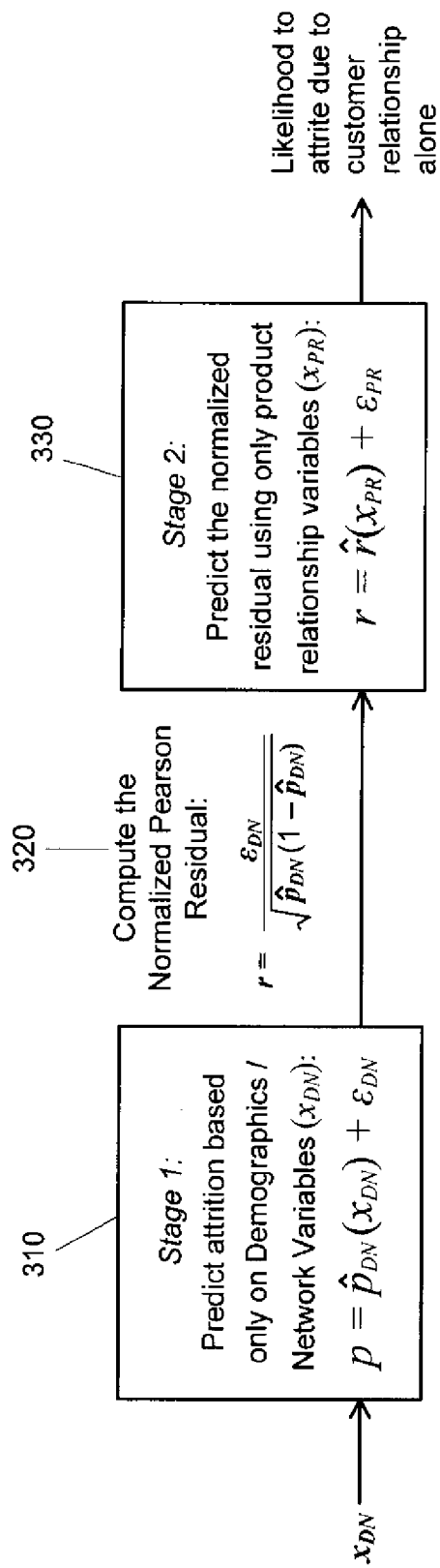
FIG. 3 illustrates an exemplary methodology for isolation modeling, according to an embodiment of the present invention.

FIG. 3 illustrates an exemplary methodology for isolation modeling according to an embodiment of the present invention. For example, stage 1, shown by 310, may model the likelihood to attrite due to demographic/network attributes. The variables may be defined as follows: x_DN represents demographic and network predictors; p represents probability of attrition; epsilon_DN represents the part of the attrition probability that cannot be explained by demographics and network; r represents normalized Pearson residual (the part of the attrition probability that cannot be explained by demographics and network, adjusted for the part of the probability that depends on demographics and network); x_PR represents product and relationship predictors; and epsilon_PR represents the part of the residual that cannot be explained by product and relationship. Normalized Pearson Residual may be computed, as shown by 320. Stage 2, shown by 330, may predict the residual from stage 1 using customer relationship variables. Households scoring high in the final stage of the model may be considered likely attriters whose behavior could not be explained using demographic or network variables alone.

Isolation modeling may result in an increase in the number of affluent households in the top model deciles due to decreasing balances and low activity that may not be captured in a standard model. As a result, less affluent households with strong product activity that were not previously scored as having high likelihood to attrite may score lower in the Isolation Model.

Figure 4:
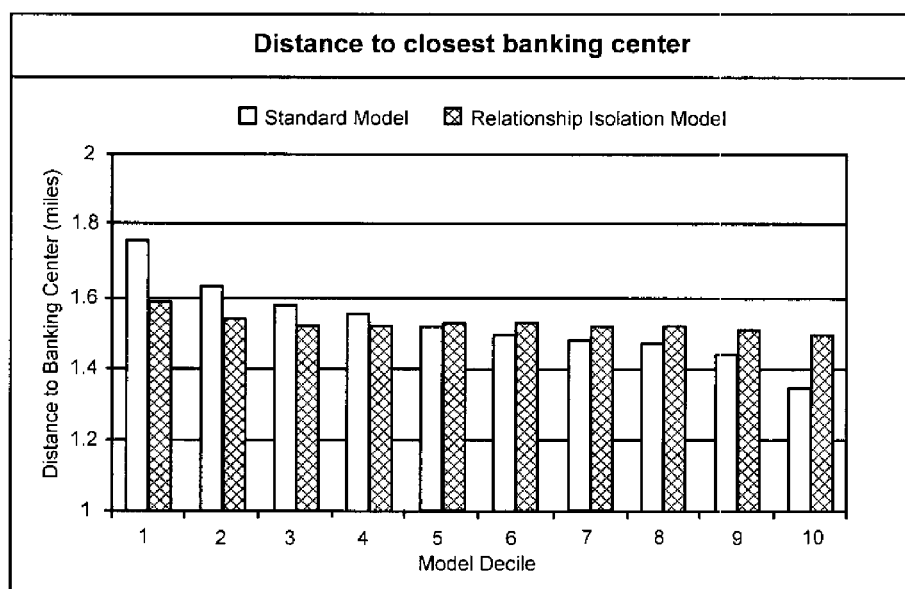
FIGS. 4-9 illustrate results from isolation modeling, according to an embodiment of the present invention.
Figure 5:
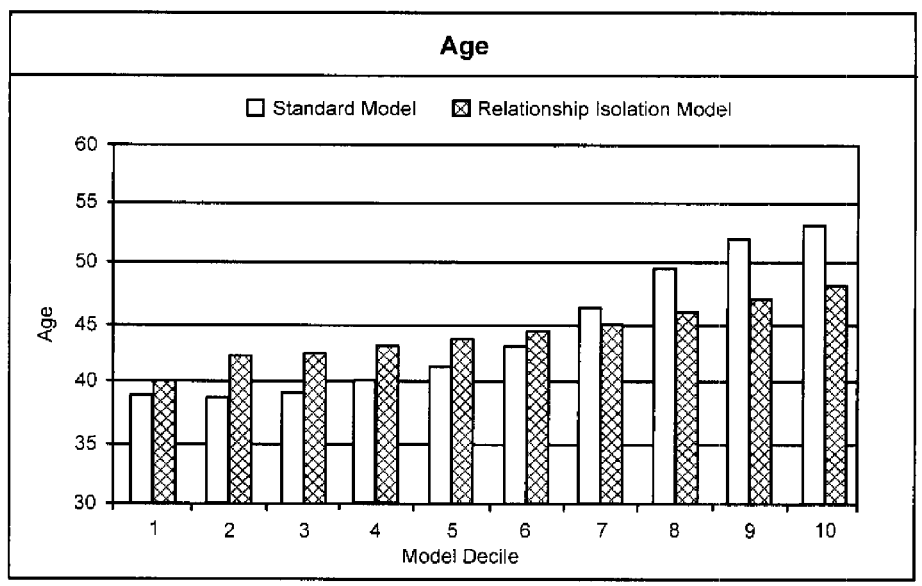
Figure 6:
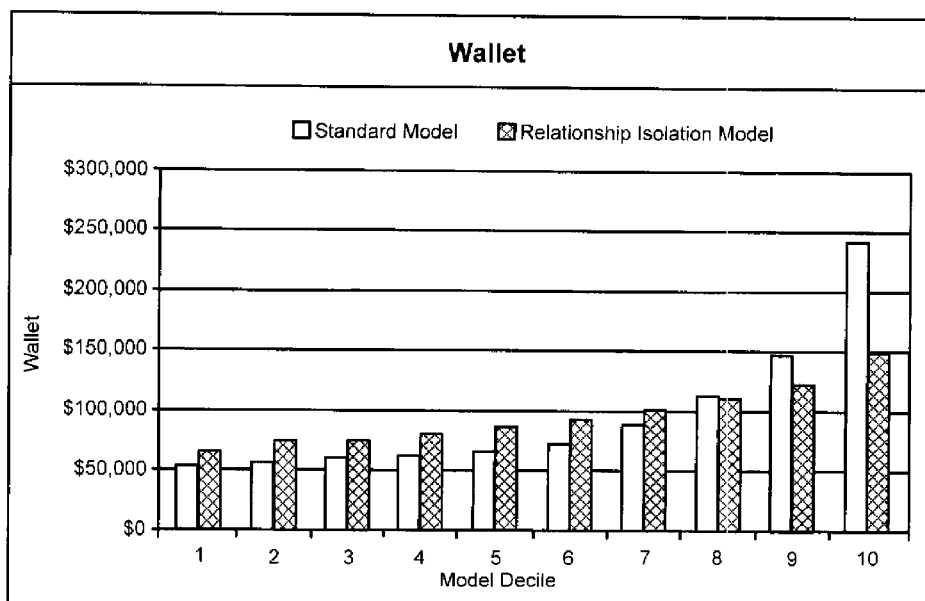
Figure 7:
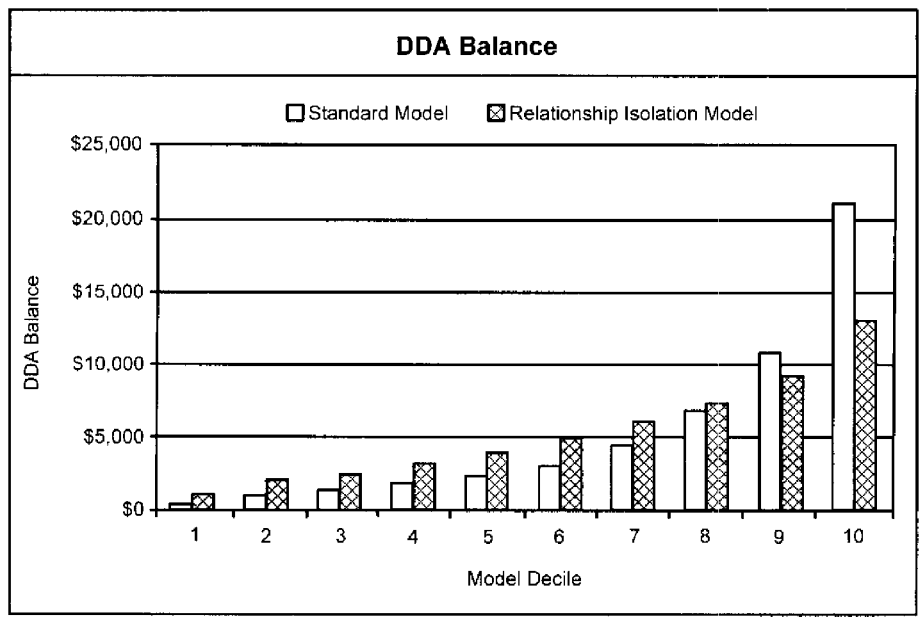
Figure 8:
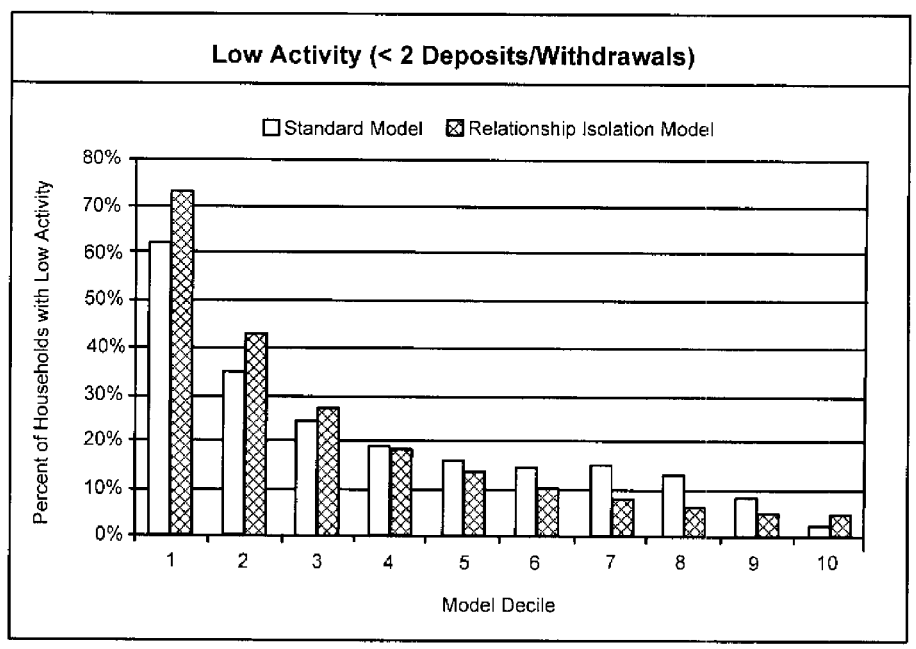
Figure 9:
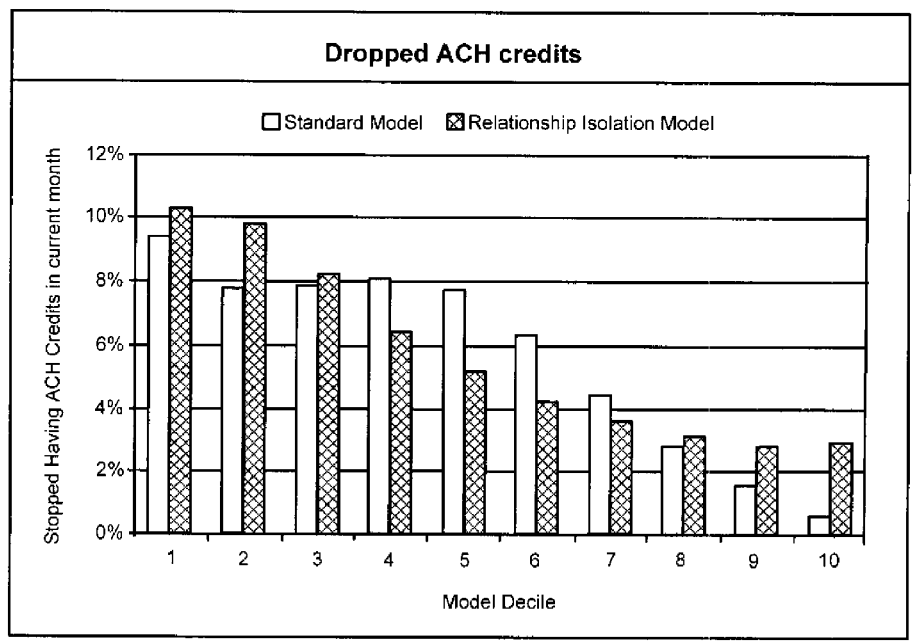

FIGS. 4-9 illustrate results from isolation modeling and provides a comparison of standard isolation and relationship isolation according to an embodiment of the present invention. FIG. 4 illustrates a comparison based on distance to closest banking center. FIG. 5 illustrates a comparison based on age. FIG. 6 illustrates a comparison based on wallet. FIG. 7 illustrates a comparison based on DDA balance. FIG. 8 illustrates a comparison based on low activity. FIG. 9 illustrates a comparison based on dropped ACH credits.

Figure 10:
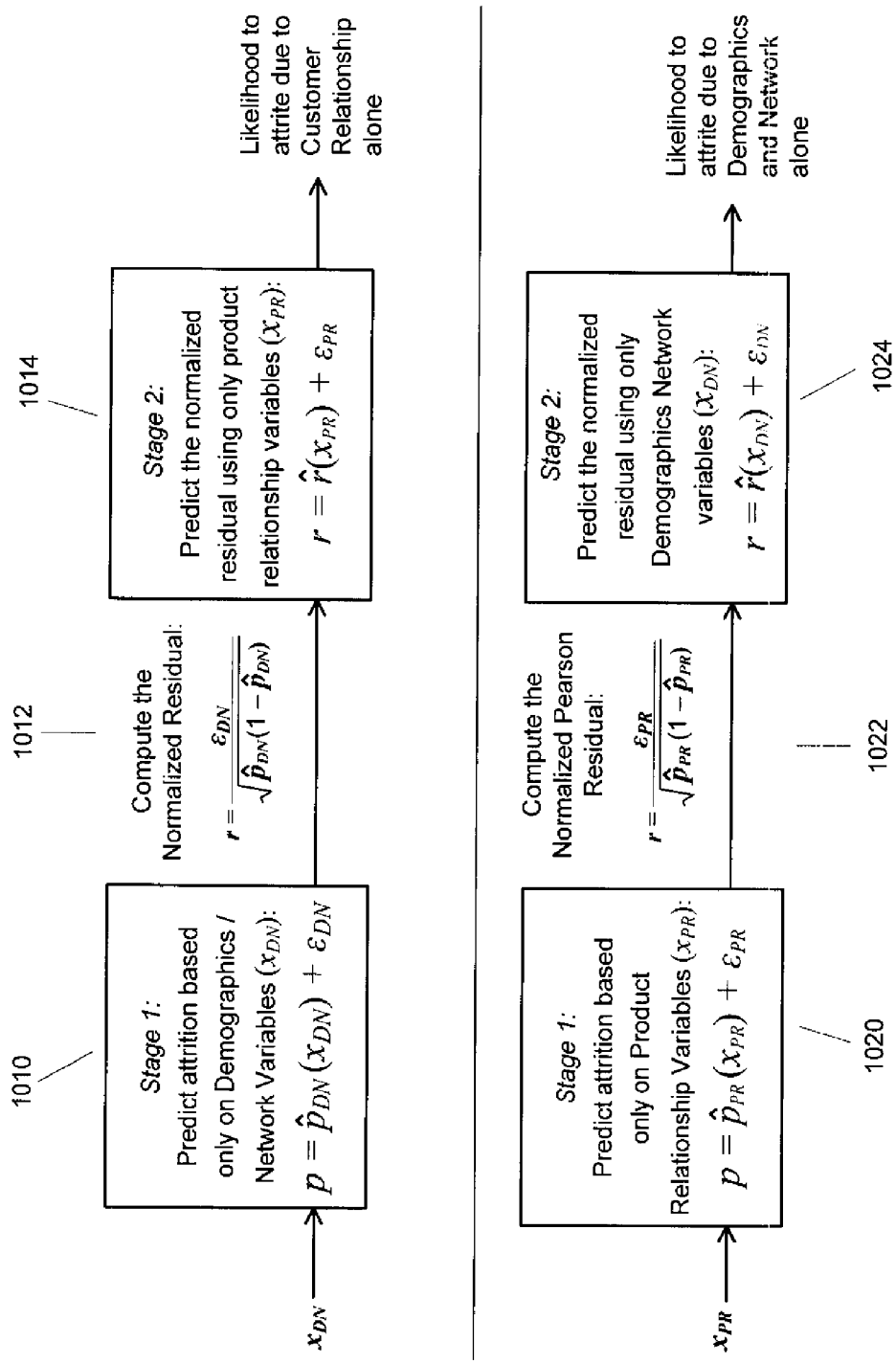
FIG. 10 illustrates a relationship isolation sequence, according to an embodiment of the present invention.

An embodiment of the present invention may combine isolation models. For example, enhanced targeting flexibility may be obtained by isolating different behavioral drives of attrition. For example, FIG. 10 illustrates a relationship isolation sequence, according to an embodiment of the present invention. At stage 1, as shown by 1010, attrition is based only on demographics/network variables. A normalized residual may be computed, as shown by 1012. At stage 2, as shown by 1014, the normalized residual is predicted using only product relationship variables. As a result, the likelihood of attrition is based on customer relationship alone. Another example illustrates a demographic/network isolation sequence, according to an embodiment of the present invention. At stage 1, as shown by 1020, attrition is based only on product relationship variables. A normalized residual may be computed, as shown by 1022. At stage 2, as shown by 1024, the normalized residual is predicted using only demographics network variables. As a result, the likelihood of attrition is based on demographics and network alone. Other variations may be implemented.

Figure 11:
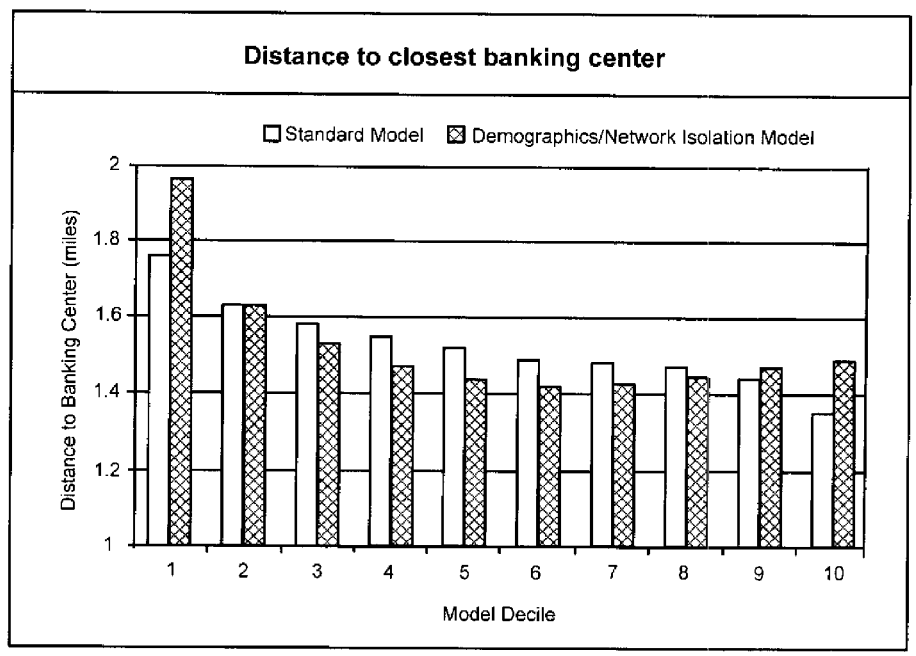
FIGS. 11 and 12 illustrate results from isolation modeling, according to an embodiment of the present invention.
Figure 12:
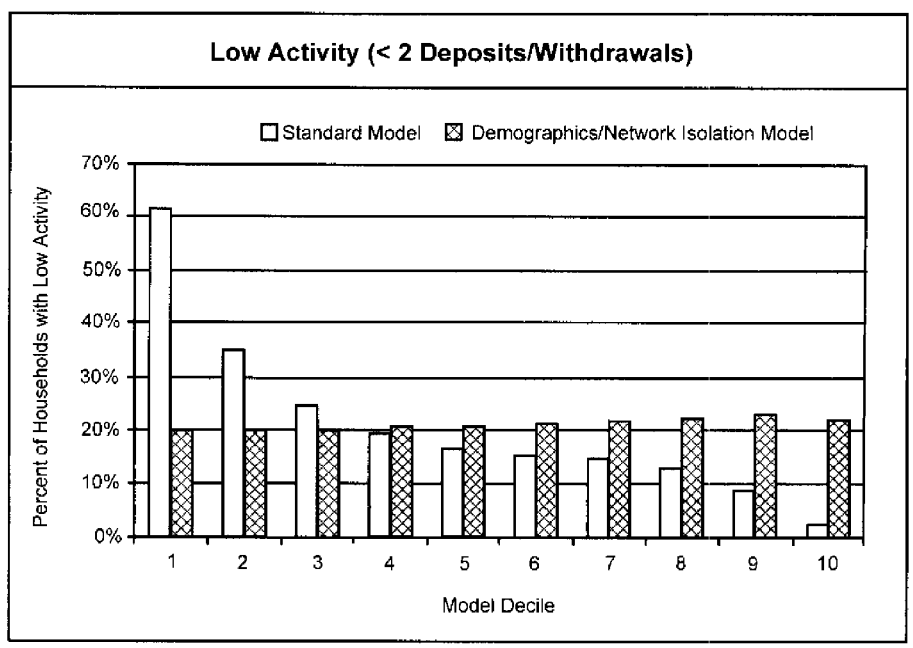

FIGS. 11 and 12 illustrate results from isolation modeling and provides a comparison of standard isolation and demographics/network isolation according to an embodiment of the present invention. FIG. 11 illustrates a comparison based on distance to closest banking center. FIG. 12 illustrates a comparison based on low activity.

With a multi-stage isolation approach of an embodiment of the present invention, predictions from each stage may be combined and/or used in conjunction to arrive at an overall prediction of behavior. For example, different sequences of variable groups may be implemented. The results of each may be combined to predict the relative effect of each group of variables on a final prediction of behavior. Each sequence may be used to create a matrix that may be used to further enhance targeting and help develop targeting strategies. In the household checking attrition example, an embodiment of the present invention may predict the likelihood to attrite using a demographic/network isolation model and a behavior isolating model, for example. In particular, the scores may be overlaid and individuals who score high in both models may represent households that are likely to attrite based on various input factors. The targeting matrix may allow a user to see not only who is likely to attrite, but why they are likely to attrite.

An embodiment of the present invention provides an ability to automatically visualize profiles of variables. For an attrition model, demographics is generally a heavy driver of the likelihood to attrite. Thus, less affluent households are much more likely to attrite than more affluent households. As a result of that, there are product relationship variables, such as balance, that are still heavily correlated with demographics. For instance, checking balance or account balance may be heavily correlated with affluence so that a more affluent household with higher account balances may be less likely to attrite. With an isolation modeling approach of an embodiment of the present invention, after the effect of demographics is removed with respect to a relative group of peers, the impact of balance as a product relationship variable may be diminished. A software tool of an embodiment of the present invention allows the user to visually compare input variable profiles within the model deciles across several isolation models and a standard model. As a user builds such models, the user may also view the effects through an interface that allows users to compare results, e.g., attrition rate by product balance, with those of a standard model when isolation modeling is not applied. The result may indicate that the model trends in a skewed fashion towards households with lower balances as being more likely to attrite. The user may then want to modify and isolate other factors in a certain way and run the model until the results are more flat. In other words, balance no longer matters because the effects of demographics are diminished or removed. Thus, an embodiment of the present invention provides the ability to interact with the algorithm, view profiles, make changes to model on the fly based on the visualization capability.

Another functionality may be directed to creating different isolation sequences, where different groups of behaviors may be isolated separately. For example, a user may predict the likelihood that a household will attrite based on product relationship alone where other types of variables have been neutralized. In addition, the user may build a separate model that predicts the likelihood to attrite based on network strength alone while isolating for the other groups of variables. Through an embodiment of the present invention, a user may envision different combinations of various groups of variables where the user can describe a household's propensity to behave based on certain groups of variables and arrive at an overall picture of why the household is behaving in the way they are going to behave. In other words, how much does network strength play a role in attrition? Are they close to a bank? Do they have a lot of ATMs in the area? How much does the relationship play a role in their likelihood to attrite? Are their balances changing? Have they been calling the call center and making inquiries? Multiple stages or multiple sequences of these models may be implemented to arrive at an overall targeting scheme or a matrix that allows the user to understand why a customer is going to behave in that way. An embodiment of the present invention is directed to a tool that provides the ability to implement multiple sequences and also visualize the result relative to each of these sequences.

Figure 13:
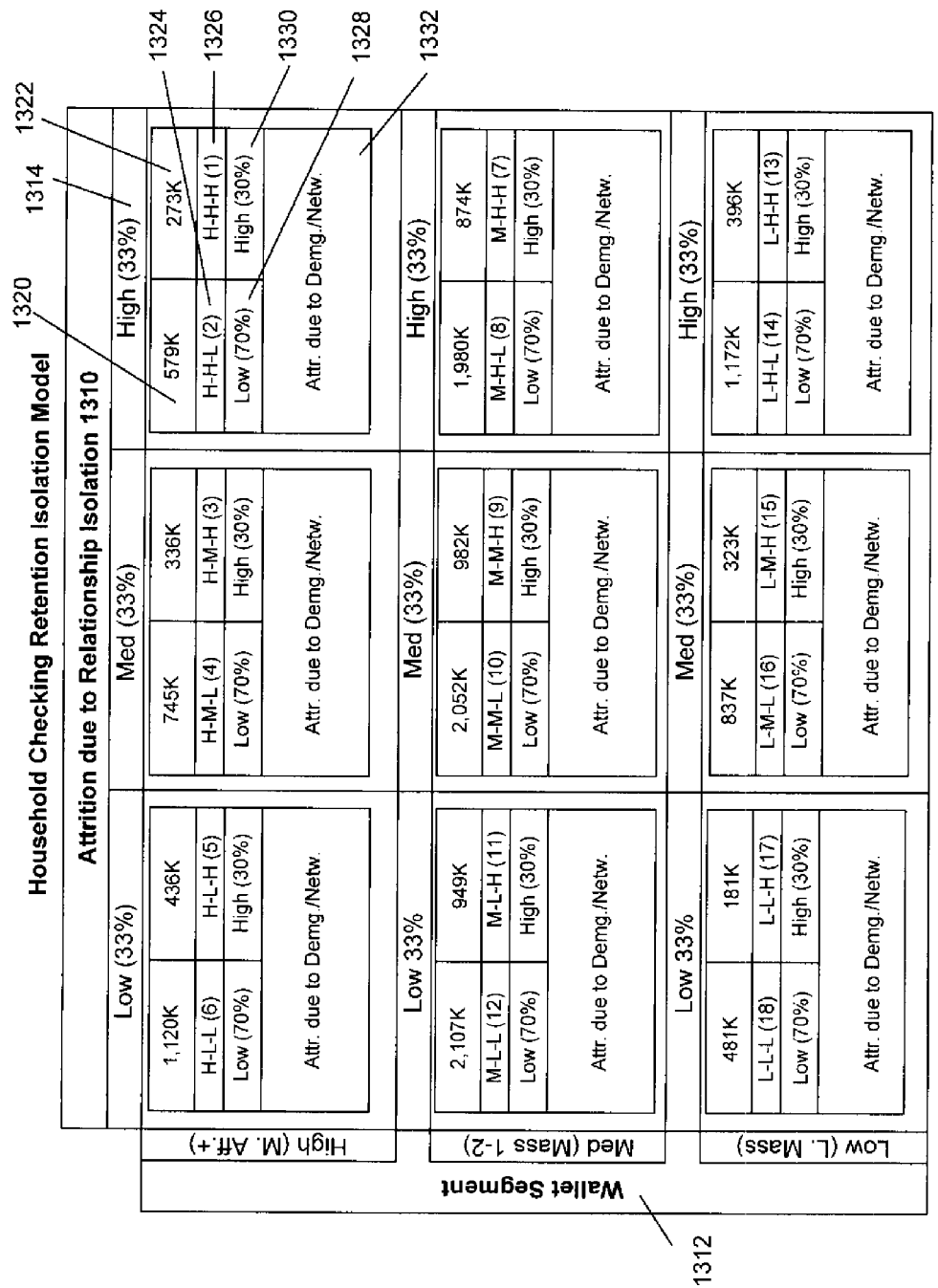
FIG. 13 is an illustration of an isolation model targeting matrix, according to an embodiment of the present invention.

FIG. 13 is an illustration of an isolation model targeting matrix, according to an embodiment of the present invention. In this exemplary illustration, attrition due to relationship isolation, as shown by 1310, may be compared against wallet segment, as shown by 1312. In this example, there are nine segments. However, the matrix may be divided into more or less segments. Within each wallet segment of low, medium and high, attrition due to relationship isolation may be presented in three segments of low, medium and high. The target matrix may include three dimensions: (1) Attrition due to Product Relationship Isolation (as shown by the columns), (2) wallet segment (as shown by the rows; this information may be used to assess value), and (3) Attrition due to demographics and network strength isolation (broken out in each cell combination of the first two dimensions). The Relationship Isolation score may be divided into High (H), Medium (M), and Low (L) segments such that there is a uniform distribution of households from the bank's portfolio in each of the segments. Demographics/Network scores are divided into (H) High and Low (L) segments similarly. Wallet may be divided into three segments that are of strategic interest to the bank: Low Mass (<$5 k; "Low"—L), Mass ($5 k—$100 k; "Medium"—M), and Mass Affluent and above ($100k+; "High"—H). These three dimensions may be combined into 18 cells: High Wallet, High Relationship Score, High Network/Demographics score (H–H–H), . . . , Low Wallet, Low Relationship Score, Low Network/Demographics score (L–L–L). Within each combination of these three dimensions, relevant information may be displayed including: number of households, attrition rate, average wallet, income, age, percentage of households within a predetermined distance (e.g., less than 1 mile) from a banking center, contribution margin and segment, for example. An exemplary cell is shown by 1314 which represents attrition due to demographics and network strength, as shown by 1332. In this exemplary cell, 1320 represents a number of households in the low percentage of the cell (Low 70% as shown by 1328) and 1322 represents a number of households in the high percentage (High 30% as shown by 1330) of the cell. 1324 indicates that the lower 70% segment of the cell represents High Wallet, High Relationship Score, Low Network/Demographics score (H–H–L) and 1326 indicates that the higher 30% segment of the cell represents High Wallet, High Relationship Score, High Network/Demographics score (H–H–H). Similar information is provided in each of the remaining cells of the matrix.

An embodiment of the present invention may be directed to treating a customer with a marketing offer or a marketing program in different ways based on the different ways that the customer is likely to behave. For example, in a retention program, it may be determined that a particular household is likely to attrite based on their network strength (e.g., the customer lives very far away from a bank). For this customer, the provider may treat them with a different offer or a different service message than another customer who lives near many banking centers, but nevertheless has a high likelihood to attrite based on their product relationships. This customer may have balances that are changing constantly and perhaps they are an unhappy customer because they received some fees/penalties. An embodiment of the present invention enables a provider to understand reasons why a customer is going to behave the way they are being predicted to behave and then how the provider can tailor the message and/or treatment to that prediction. For example, the provider may give some offers that have certain types of messaging that highlights certain benefits of the network. Thus, the actual treatment from a marketing standpoint may be different and more tailored and thereby more effective.

Figure 14:
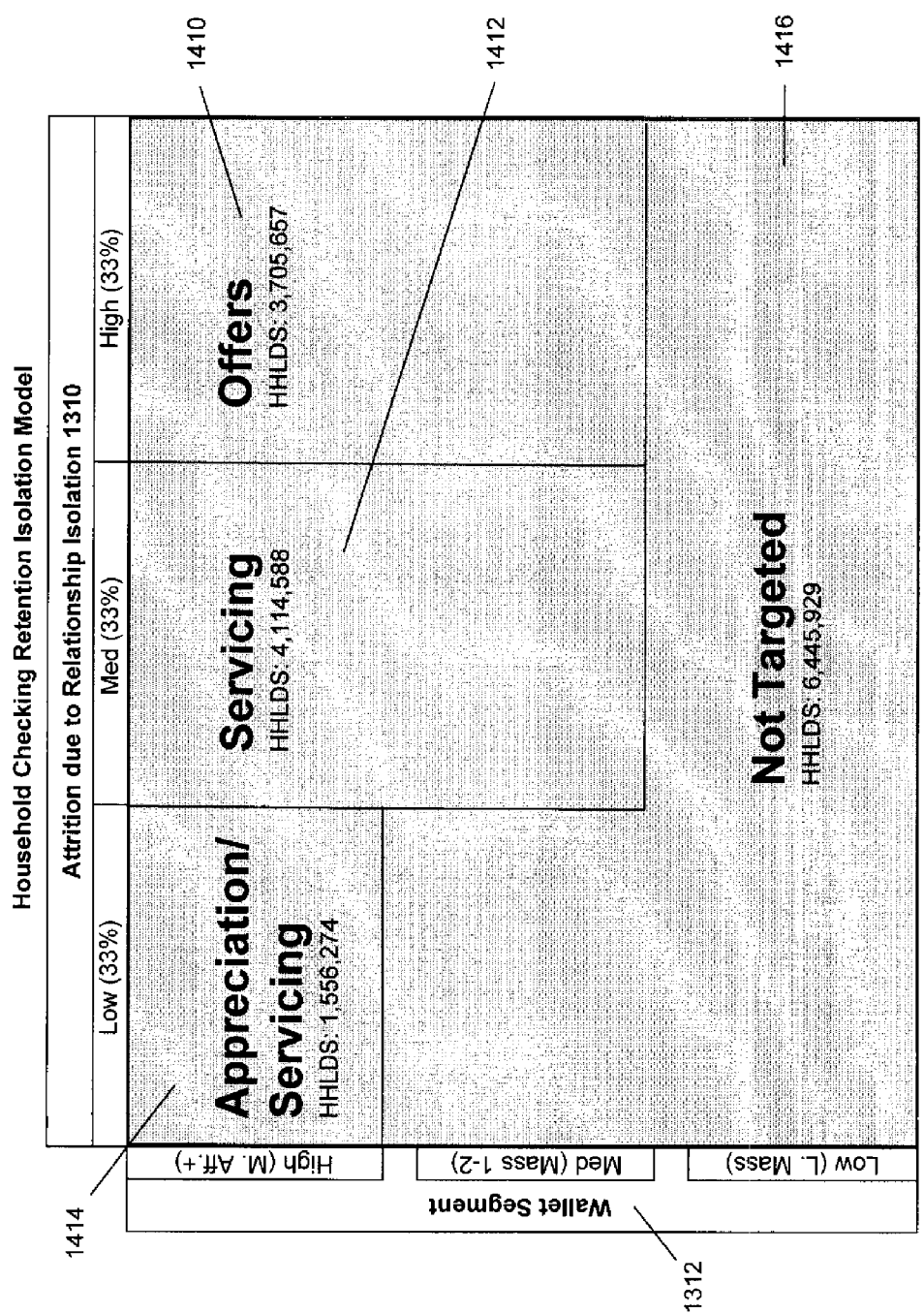
FIG. 14 is an exemplary illustration of possible retention targeting, according to an embodiment of the present invention.

FIG. 14 is an exemplary illustration of possible retention targeting, according to an embodiment of the present invention. An embodiment of the present invention may target offers using the result of the isolation behavior matrix. The targeted approach may include appreciation/servicing; servicing and offers. The high scoring segments may be targeted while the lower scoring segments may be ignored for now. Details of tailored offers for the high scoring segment may be provided. As shown in FIG. 14, HHLDS represents households the number of households receiving a type of targeted approach. As shown in FIG. 14, segment 1410 may receive offers. Another segment, shown by 1412, may receive servicing and another segment 1414 may receive a appreciation/servicing response. Another segment 1416 may not receive any form of targeting. Other actions/responses may be contemplated for the segments. Also, the segments may be divided in a different manner. Additional information may also include wallet which may represent the customer's revenue (or average revenue for that segment), attrition which may represent the percentage of the customer's likelihood to attrite and contribution margin which may represent a measure of revenue from a household.

An embodiment of the present invention is directed to identifying people who are acting in a certain way. With respect to attrition, this may involve identifying individuals who are acting like someone who is going to leave. For example, in an exemplary application of household checking attrition in retail banking, if Group 1 variables include demographic attributes and Group 2 variables include attributes of product relationship, the final Isolation Model prediction may include the likelihood to attrite based on product relationship relative to other households that have similar demographics. As a result, an embodiment of the present invention effectively removes an influence of demographics as the sole predictors of attrition. This enables a provider to target individuals in different ways.

An embodiment of the present invention may be applied to predict a next product for a customer. For customers who currently have checking accounts but do not have savings account, an embodiment of the present invention may identify those customers who are behaving like someone who is willing to open a savings account. Other possible next products may include credit card, overdraft coverage, investments, CDs, basically any new product the customer does not currently have, but appear to be behaving like they would want to purchase.

An embodiment of the present invention may be used to recognize similar trends for products and use that information to identify customers who are likely to purchase those next products at a demographic level. This feature may apply more broadly to other retailers or other providers who might want to sell other products outside their area as well. In addition, this feature could also be applied on a higher level in a situation where a parent company has different affiliates selling varying products and/or services among them.

Traditional models that attempt to predict whether a household is likely to respond to offers based on increasing balances typically trend towards more affluent households because these affluent households are the ones that actually have the balances that can meet the offer. Such offers may include offering $100 if the customer brings $25,000 in new savings balance. Thus, because of a customer would need to have $25,000 in balance, such offers will trend heavily and be dominated by demographic type of variables, such as affluent households who are more likely to respond.

An embodiment of the present invention may be directed to identifying one or more optimal channels for presenting an offer, promotion or other information. Multiple channels, including mailing offers, in person banking center offers, electronic mail offers, social media offers, etc., may be available. For example, a provider may want to provide an offer at a banking center when the customer talks to a representative, such as a teller, a personal banker, etc. For certain products and/or services, the response through an in person meeting, such as at a branch location, may be very high. These banking center driven offers may be considered more effective and thereby generate the majority of the responses as compared to mailing a paper offer. In such cases, the offer may be provided exclusively at a branch office because of its success rate. An embodiment of the present invention may assist in defining which channels to use for certain households. An embodiment of the present invention may assist a provider in finding those households that it would spend additional money to also mail the offer to because they might not be close to a branch, etc. For example, some customers may live far from a banking center and thus usually do not have many in person interactions. For those customers, an embodiment of the present invention may determine that sending mail is an optimal channel. Traditional modeling may determine that all affluent customers would receive in person offers based primarily on demographics, regardless of consideration of network strength, in particular proximity to a banking center. Thus, an embodiment of the present invention may identify more affluent households and determine that for a particular household that does not live near a banking center, a mail offer may be more appropriate and effective. An embodiment of the present invention may equalize customers on the demographic side and identify the more likely households to respond through the mailing piece. This technique may isolate a network strength characteristics.

The above discussion primarily described attrition as it applies to a banking institution. The various embodiments of behavior isolating prediction modeling may be applied to other applications.

For example, an embodiment of the present invention may be applied to social issues to determine at risk populations. Certain demographic groups may be considered at-risk for certain outcomes (e.g., dropping out of school, teen pregnancy, etc.). Isolation models in accordance with an embodiment of the present invention may identify individuals who are acting at risk, and not merely fitting a certain demographic profile.

An embodiment of the present invention may be applied to identify product cross-selling opportunities, such as insurance companies cross-selling homeowners insurance to auto insurance customers. According to traditional models, older customers might be more likely to respond to such offers, as they are more likely to own homes. A provider may use an embodiment of the present invention to isolate an age demographic in the first stage if the company has a strategic initiative to attract younger homeowners.

An embodiment of the present invention may be applied to identify purchase propensities as applied to different industries. In direct marketing campaigns for checking accounts, response rates are biased towards less affluent, younger individuals. A provider may predict the likelihood of response based on bank's network strength in a customer's area after controlling for demographics.

An embodiment of the present invention may be applied to predict voting patterns. Certain demographic or social groups are more likely to vote for certain parties, e.g., union members are more likely to vote for Democrats and active military are more likely to vote Republican. For example, campaign strategists may use an isolation model of an embodiment of the present invention to identify voters within these populations that are likely to vote in a manner that is contradictory to their social group, e.g., union members that have a higher than average likelihood to vote for a Republican candidate.

An embodiment of the present invention may be applied to customer satisfaction. A provider may wish to predict the likelihood that a household is satisfied based on their product relationship behavior while controlling for demographic biases (e.g., certain customers based on demographics are more likely to claim they are highly satisfied in customer satisfaction survey).

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

The description above describes communication devices, an application system, a communication network having network elements, storage devices, various networks, and other elements for coupling user via the communication network, some of which are explicitly depicted, others of which are not. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A computer implemented method for isolating variables in a behavior prediction model, the method comprising the steps of:
    identifying a plurality of groups comprising a first group of variables and a second group of variables;
    building a model, using a computer processor, for capturing an effect of the first group of variables in predicting behavior for customers;
    building a subsequent stage of the model, using a computer processor, on a second group of variables to neutralize the effect of the first group of variables by selectively isolating the effect of the first group of variables to remove an influence of the first group of variables on the model;
    displaying results of the model wherein the results neutralize the effect of the first group of variables in predicting behavior at a user interface, the results comprising a behavioral prediction that identifies a likelihood of a customer to behave based on the second group of variables relative to customers that match the first group of variables; and
    identifying a response based on the results for a segment of the customers.

2. The method of claim 1, wherein the model predicts likelihood of attrition in a banking application.

3. The method of claim 1, wherein the first group of variables comprises demographic variables.

4. The method of claim 3, wherein the second group of variables comprises network strength variables or product relationship variables.

5. The method of claim 3, wherein the second group of variables comprises network strength variables and the plurality of groups comprises a third group of variables comprising product relationship variables.

6. The method of claim 1, further comprising the step of:
    combining the results with one or more results of one or more additional iterations of applying the model and viewing the combined results in a matrix format.

7. The method of claim 1, wherein the variables for one or more of the first group and the second group are defined by the user.

8. The method of claim 1, further comprising the step of:
    defining an order sequence for applying each group of the plurality of groups to the model.

9. The method of claim 1, wherein the response comprises a tailored marketing offer based on the results.

10. The method of claim 1, wherein a user selects an algorithm for building the model.

11. The method of claim 1, wherein a user interacts with the results of the model by making changes to the model.

12. A computer implemented system for isolating variables in a behavior prediction model, the system comprising:
    an input module configured to identify a plurality of groups comprising a first group of variables and a second group of variables;
    a modeling module, comprising a computer processor, configured to build a model for capturing an effect of the first group of variables in predicting behavior for customers and further configured to build a subsequent stage of the model on a second group of variables to neutralize the effect of the first group of variables by selectively isolating the effect of the first group of variables to remove an influence of the first group of variables on the model; and
    an interface configured to display results of the model wherein the results neutralize the effect of the first group of variables in predicting behavior, the results comprising a behavioral prediction that identifies a likelihood of a customer to behave based on the second group of variables relative to customers that match the first group of variables.

13. The system of claim 12, wherein the model predicts likelihood of attrition in a banking application.

14. The system of claim 12, wherein the first group of variables comprises demographic variables.

15. The system of claim 14, wherein the second group of variables comprises network strength variables or product relationship variables.

16. The system of claim 14, wherein the second group of variables comprises network strength variables and the plurality of groups comprises a third group of variables comprising product relationship variables.

17. The system of claim 12, wherein the results arc combined with one or more results of one or more additional iterations of applying the model and viewing the combined results in a matrix format.

18. The system of claim 12, wherein the variables for one or more of the first group and the second group are defined by the user.

19. The system of claim 12, wherein the input module is further configured to define an order sequence for applying each group of the plurality of groups to the model.

20. The system of claim 12, wherein the response comprises a tailored marketing offer based on the results.

21. The system of claim 12, wherein a user selects an algorithm for building the model.

22. The system of claim 12, wherein a user interacts with the results of the model by making changes to the model.

* * * * *